No. 827,930. PATENTED AUG. 7, 1906.
G. MIDDLETON.
WHEEL FOR ROAD VEHICLES.
APPLICATION FILED JAN. 10, 1905.
2 SHEETS—SHEET 1.
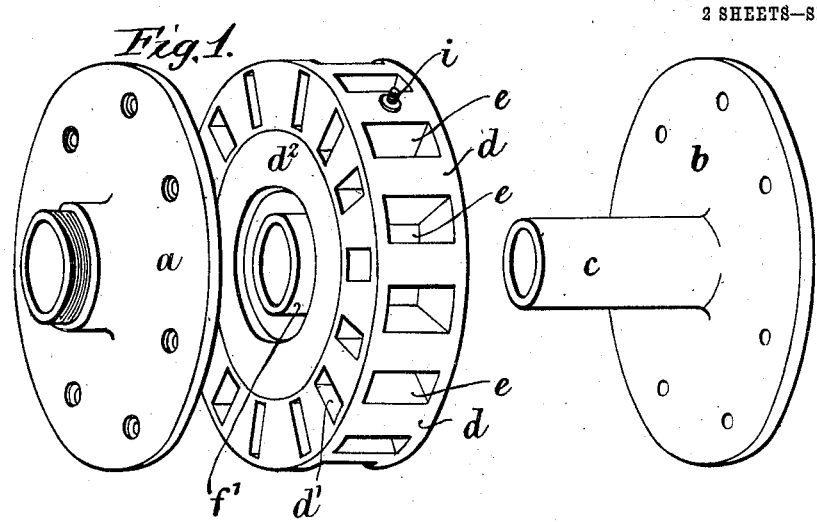
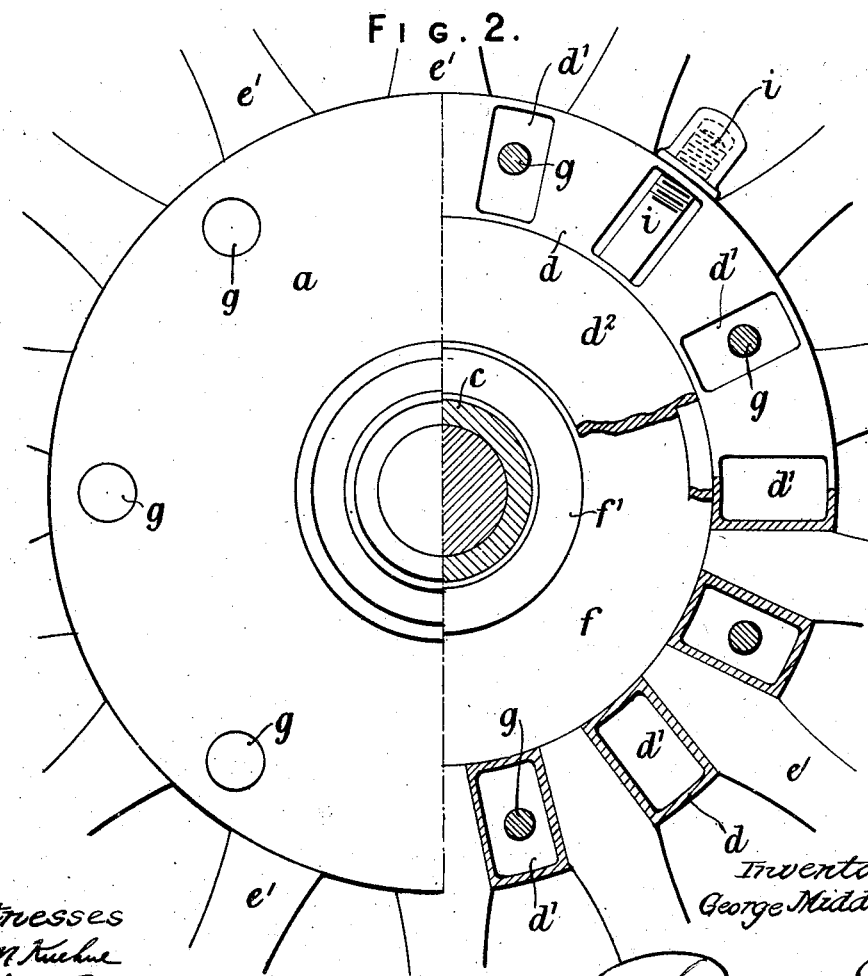
Witnesses
Inventor
George Middleton

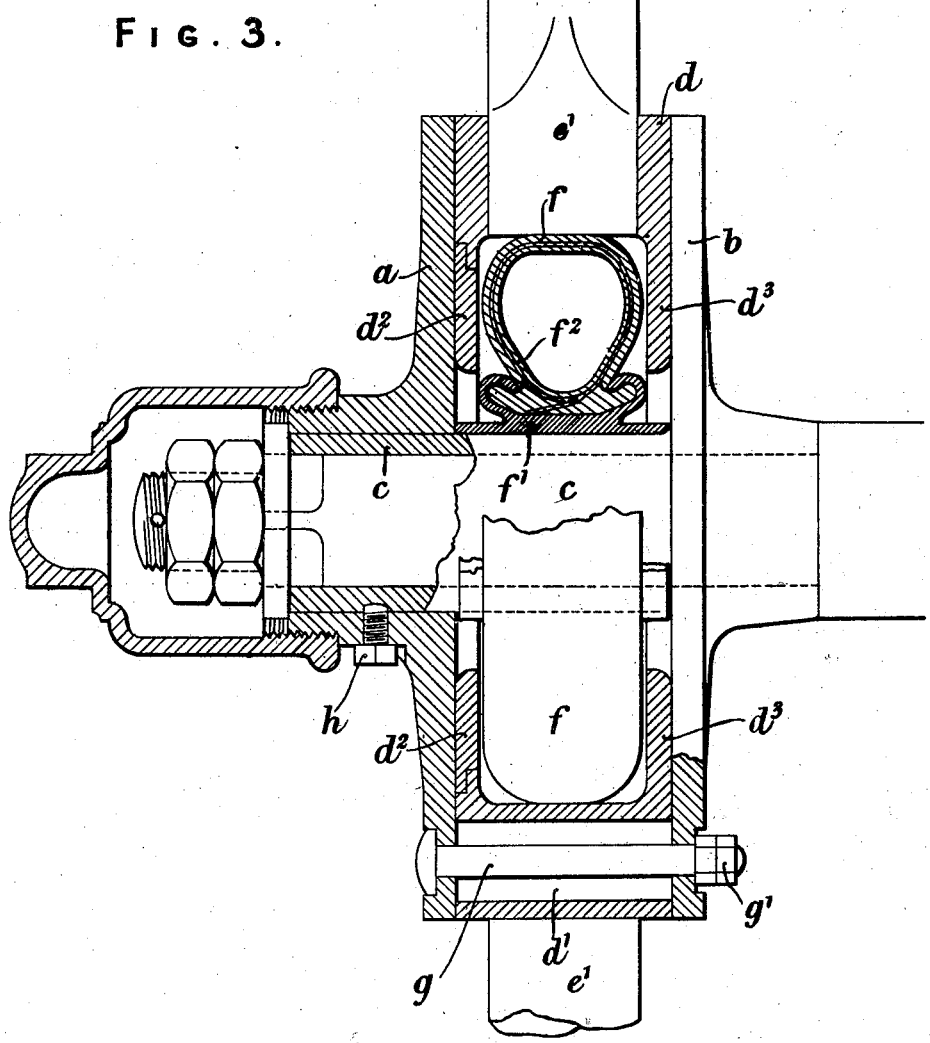

UNITED STATES PATENT OFFICE.

GEORGE MIDDLETON, OF PUTNEY, LONDON, ENGLAND.

WHEEL FOR ROAD-VEHICLES.

No. 827,930.  Specification of Letters Patent.  Patented Aug. 7, 1906.

Application filed January 10, 1905. Serial No. 240,508.

*To all whom it may concern:*

Be it known that I, GEORGE MIDDLETON, coach-builder, a subject of the King of Great Britain, residing at Putney, London, England, have invented certain new and useful Improvements Relating to Wheels for Road-Vehicles, of which the following is a specification.

My invention relates to pneumatic hubs for the wheels of automobiles and other road-vehicles.

As hitherto constructed pneumatic hubs have proved unsatisfactory and unreliable and have consequently been abandoned owing to serious defects which totally precluded their use. The chief defects were their instability—*i. e.*, the plane of the wheel did not remain at right angles to the axle when in use—and, beside this, the pneumatic tube frequently became cut, so that it no longer held air, the internal parts of such hubs nipping the pneumatic tube and causing leaks. These and many other defects have prevailed, so that at the present time, although in great demand, there are few, if any, pneumatic hubs in actual use or for sale.

The object of my invention is to effect improvements in the construction and arrangement of such hubs and their parts whereby to overcome the above-mentioned and other defects which have hitherto rendered pneumatic hubs impracticable.

In the accompanying drawings, Figure 1 illustrates my improved pneumatic hub with some of the parts detached. Fig. 2 is a sectional front view, and Fig. 3 is a sectional side view.

$a\ b$ are flanges, one of which, $b$, may be integral with the tubular axle box or sleeve $c$. $d$ is a flanged spoke-drum which is free to move transversely to the axis and parallelly between said flanges $a\ b$ for a limited distance. The drum $d$ is formed with openings $e$ for the spokes $e'$, the intervening spaces being occupied by hollow blocks $d'$, the walls of which are, as will be understood, cast or formed in one piece with the sides, and flanges $d^2\ d^3$ of the drum $d$.

$f$ represents a pneumatic tube or ring which, as shown, is composed of a metal rim $f'$, which encircles the sleeve $c$ and is free to rotate thereon, and an inflatable tube $f^2$, which is preferably inclosed in or formed integral with an inextensible outer cover $f$, secured to said rim in any suitable manner, such as by the well-known means shown in Fig. 3, but always in such a manner as will restrict the spreading of the pneumatic ring at or near its base. The pneumatic ring $f$ is boxed in on three sides by the drum $d$ and its flanges $d^2\ d^3$, one of which or a part thereof, $d^2$, is detachable, so as to allow of the pneumatic ring being removed or inspected.

$i$ is the valve by means of which the pneumatic ring is inflated.

As shown, the flanged rim $f'$ is located in its proper position by the inner surfaces of the hub-flanges $a\ b$. The rim may be otherwise constructed or shaped so that it not only restricts the spreading of the base of the pneumatic ring, but also so that it is held in position by the inner surfaces of the flanges $d^2\ d^3$, such as by increasing the depth of the rim at its sides. By these means it is impossible for the pneumatic ring to become nipped or cut by the action of the drum between the flanges $a\ b$. The rim $f'$, being free to rotate upon the axle-sleeve, also prevents any possible creeping action of the pneumatic ring with regard to the drum $d$, and therefore obviates the usual tearing of the valve from the pneumatic ring, due to such creeping action around the sleeve.

The two flanges $a\ b$ are held together by bolts $g$ passing through alternate hollow blocks $d'$ and secured by nuts $g'$, only sufficient play being allowed between the drum $d$ and the flanges $a\ b$ to allow of a short motion of the drum transversely with respect to the axis without permitting any appreciable side play or instability. Antifriction balls or rollers may in some cases be fitted between the drum and the flanges. The bolts $g$ may be otherwise arranged—for instance, outside the periphery of the drum $d$, between the spokes and passing through eyes formed on the flanges $a\ b$. The flanges $a\ b$ may be secured in their relative positions by a set-screw $h$.

I claim—

1. In a pneumatic hub for road-vehicles, a rim constructed with side flanges to restrict the lateral spreading of the inflatable tube, said rim being free to rotate upon the axle-sleeve.

2. In a pneumatic hub for road-vehicles, a pneumatic ring comprising an inflatable tube, an inextensible outer cover for said tube, a rim mounted free upon the axle-sleeve and having flanges thereon adapted to restrict the spreading of the sides of said cover, and means to secure said cover and tube in said rim.

3. A pneumatic hub for road-vehicles, comprising a pair of flanges, an axle-sleeve integral with one of said flanges, a spoke-drum located between said flanges, a metal ring having flanges thereon and adapted to rotate around the axle-sleeve, a pneumatic ring located within and supporting said spoke-drum and detachably secured to the metal rim by the said flanges, and means to retain said parts in working position.

4. A pneumatic hub, comprising a pair of flanges, an axle-sleeve integral with one of said flanges, a spoke-drum located between said flanges and formed with hollow blocks leaving openings or sockets between them for the inner ends of the spokes, a flange integral with said drum, a flange detachable from said drum, a metal rim mounted upon the axle-sleeve, a pneumatic ring detachably fixed to said rim and bearing against the inner periphery of said spoke-drum, means locating the position of said rim with respect to said flanges and drum, and means connecting said drum to said flanges so as to rotate therewith while allowing of a limited motion in a plane transverse to the axis.

5. The combination with a pair of flanges and an axle-sleeve integral with one of said flanges, of a spoke-drum constructed with a pair of sides and flanges connected by hollow blocks leaving openings or sockets for the inner ends of the spokes, a pneumatic ring fixed in a metal rim mounted upon said axle-sleeve, flanges upon said rim extending to the axle-flanges adapted to prevent longitudinal or axial movement of said rim upon said axle-sleeve, and means such as the bolts and nuts described connecting said axle-flanges with said drum in the manner set forth.

In testimony whereof I have hereunto set my hand in presence of two subscribing witnesses.

GEORGE MIDDLETON.

Witnesses:
GEORGE C. DOWNING,
WALTER J. SKERTEN.